Feb. 3, 1953 A. G. JOHNSON ET AL 2,627,388
TRANSFER CHECK VALVE
Filed July 1, 1949
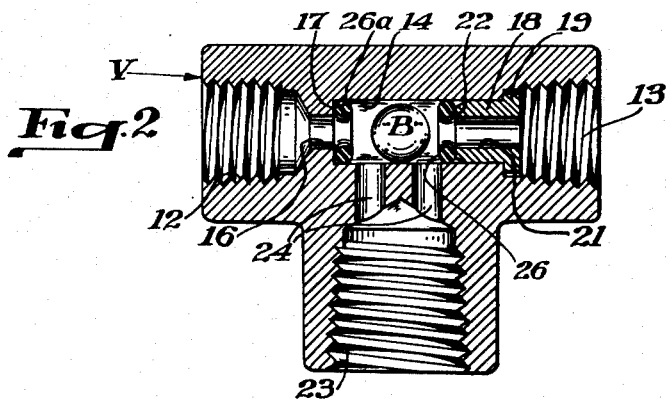
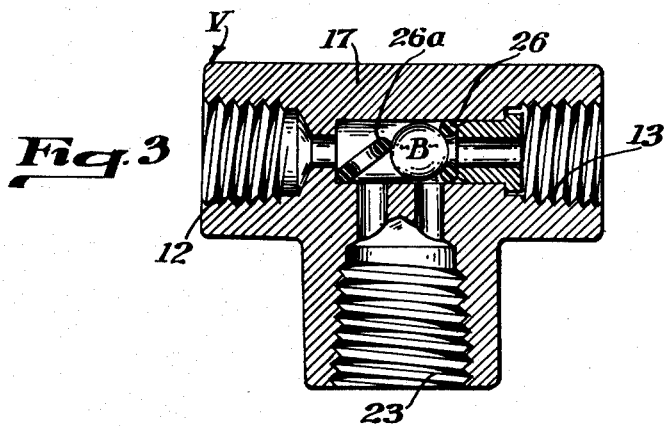
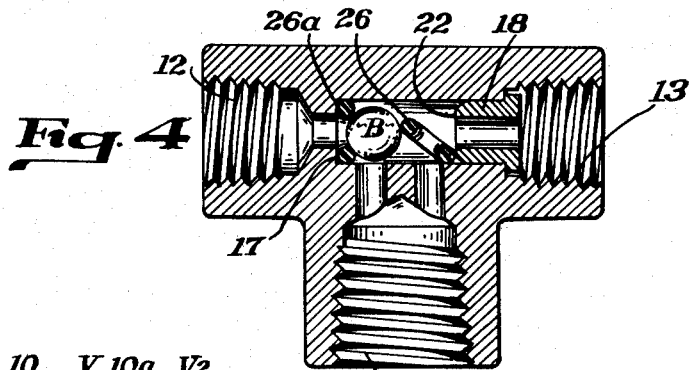
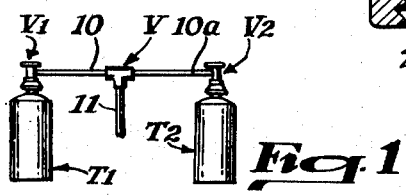
INVENTORS.
ANDREW G. JOHNSON &
THEODORE A. ST. CLAIR.
BY Richey & Watts
ATTORNEYS.

Patented Feb. 3, 1953

2,627,388

UNITED STATES PATENT OFFICE 2,627,388

TRANSFER CHECK VALVE

Andrew G. Johnson, Lakewood, and Theodore A. St. Clair, East Cleveland, Ohio, assignors to The Weatherhead Company, Cleveland, Ohio, a corporation of Ohio Application July 1, 1949, Serial No. 102,586

4 Claims. (Cl. 251—118)

This invention relates to valves and more particularly to transfer check valves for connection between two sources of fluid under pressure and a common fluid delivery line. For example, the valve of the invention is adapted for connection between a pair of valved tanks containing liquefied petroleum gas and the service line.

In the aforesaid system one tank may be termed the primary tank and the other the reserve tank. In operation, the valve for the reserve tank is closed and that for the primary opened, whereupon the transfer valve is urged by fluid pressure to a position tending to close off the reserve tank. When the primary tank is exhausted or at a low delivery pressure, the valve for the reserve tank is opened and fluid under pressure from the reserve tank causes the check element in the transfer valve to move to a second position sealing off the inlet from the primary tank. Thus the transfer check valve permits removal and replacement of an exhausted tank without leakage from the other tank connected to the system.

The principal object of the invention resides in providing a transfer valve which will seal off the open or low pressure line with a very small pressure differential between the two inlets. Difficulties have been encountered in prior valves in this service in sealing off the exhausted tank under circumstances wherein the pressure available from the active tank is low, that is in the neighborhood of 10 pounds per square inch or less. With applicants' valve, however, the exhausted tank may be removed and the active tank will be sealed from the atmosphere even though the pressure of fluid delivered to the transfer valve is as low as 5 pounds per square inch, and this pressure will be retained for a long period of time.

Effective checking action at low pressure differentials is accomplished by mounting to act as resilient seats for the ball check a pair of what is known as O-ring seals. In order that these soft rubber seals may have an unusually effective sealing action with the check valve, it is important that they be unconfined and that they are not circumferentially crowded or cramped by the chamber in which they fit because circumferentially crowding of these seals tends to distort them and increases the force necessary to produce a fluid seal. Thus, the O-rings are necessarily relatively loosely mounted in the chamber so that the inactive O-ring may become dislodged and fall away from its normal position. However, in accordance with the invention dislodgement of the seal is rendered inconsequential by structure wherein the spacing of the chamber shoulders against which the O-rings normally rest is of such a distance relative to the diameter of the chamber that if the free O-ring falls from its seat it rests against the ball above the center thereof and is readily cammed into position upon reversal of the pressure differential between the inlets.

A preferred construction which attains the aforesaid new and improved results will be described in detail in order that others skilled in the art may practice and carry out the invention.

In the drawings:

Fig. 1 is a schematic view of the connections of a typical application of the invention; and, Figs. 2 to 4 are longitudinal sections through the transfer valve showing the parts in various positions which they may assume.

Referring to Fig. 1 a pair of tanks $T_1$ and $T_2$ which contain fluid under pressure such as liquefied petroleum gas are indicated. For purposes of illustration $T_1$ may be considered the primary tank and $T_2$ the auxiliary tank. $T_1$ contains the valved outlet $V_1$ connecting by means of line 10 to the novel transfer valve V. $T_2$ is valved as at $V_2$ and connects by means of line 10a to the other inlet of the transfer valve V. Common or outlet line 11 leads from the transfer valve V.

As seen in the other figures the transfer valve is made up of a valve body, preferably T-shaped in section, having a pair of inlets 12 and 13. Although it makes no difference how the connections are made to the inlets, for the sake of illustration assume that inlet 12 connects to the primary tank. There is an intermediate chamber 14 between the inlets. Inlet 12 connects to the chamber by means of port 16 of smaller diameter than that of the chamber so that a generally radial shoulder 17 is formed at the junction of the port and the chamber. The chamber extends to the other inlet 13 and receives a plug 18 pressed into the bore, there being a stop flange 19 on the plug and a port 21 therethrough corresponding to the other port 16. The plug includes a generally radial shoulder portion 22. The outlet 23 communicates with the chamber 14 by means of a pair of outlet ports 24.

Before the plug 18 is pressed into place in the valve body a pair of O-ring seals 26 and 26a and a ball B are placed in the chamber. The diameter of the seals is substantially no greater than that of the chamber so that they are not kinked or deformed by the chamber wall, and in fact the seals may have a diameter equal to or slightly less than that of the chamber. The ball B is of such diameter that it has a free sliding fit with the chamber wall.

In operation, assume that the reserve tank T₂ connected to inlet 13 has its valve either closed or is removed from the line. Assume also, that the primary tank T₁ is connected to inlet 12 and its valve is open supplying fluid under pressure to the valve. Under these conditions, the ball B will be urged against the O-ring seal 26 as shown in Fig. 3. Since the O-ring seal is made of relatively soft rubber material and is not crowded by the chamber wall, and due to the toroidal shape of the ring, initial contact is line contact and relatively high unit pressures occur between the ball and the O-ring. As a result, a relatively low pressure differential acting against the ball is enough to deform the O-ring and produce an excellent seal.

As illustrated in Fig. 3 if the other O-ring 26a becomes dislodged from its position against shoulder 17 it merely falls against the ball and rests thereupon above the center of the ball. It is therefore in position to be cammed back into place against the shoulder when the pressure differential at the inlets is reversed, as would occur upon removal of the primary tank and opening the valve of a charged reserve tank. Thus, the valve construction permits a relatively loose mounting of the O-ring in the chamber without danger of displacement of the O-ring to a position wherein it cannot be returned to its sealing zone. It has been explained that it is important that the O-ring be uncrowded circumferentially so that an effective seal will be obtained with a low pressure differential.

Fig. 4 shows the situation wherein the pressure differential at the inlets has been reversed, the ball B having cammed the O-ring 26a back against the shoulder 17 and sealed with the ring. The other ring 26 is shown dislodged from its normal position against shoulder 22, but the ring rests against the ball B in position to be again cammed to its normal position by the ball when the pressure differential is restored by connecting a refilled primary tank T₁ to inlet 12.

Having described a preferred embodiment of our invention so that others may use and practice the same, it will be understood that various modifications thereof may be made without departing from the scope of the invention as defined in the appended claims:

What is claimed is:

1. A transfer valve for fluid pressure systems comprising a body having opposed inlets for connection to separate sources of fluid under pressure, a valve chamber intermediate said inlets, inlet ports of smaller diameter than said chamber connecting between said inlets and said chamber, a generally radially extending annular shoulder formed at the junction of said ports and the chamber, an outlet in said body, outlet port means leading generally radially from said chamber and communicating with said outlet, a pair of O-rings of relatively soft sealing material disposed in said chamber, the periphery of said rings being of substantially the same diameter as that of said chamber and in light engagement with the wall of said chamber, and a ball check of substantially the same diameter as that of said chamber loosely disposed in said chamber between said O-rings, the axial separation between said shoulders relative to the diameter of said chamber being such that with the ball in pressure engagement with one O-ring, if the free O-ring falls from its position fully against its shoulder to a position wherein one part of the ring engages the shoulder and a diametrically opposed part engages the ball, the point of engagement of the ring and the ball will be above a line passing through the center of the ball and the center of the ring section at the shoulder, whereupon the ball may cam the free O-ring fully against its shoulder in response to a reversal of the pressure differential between the inlets, said O-rings being internally unconfined.

2. A transfer valve for fluid pressure systems comprising a body having opposed inlets for connection to separate sources of fluid under pressure, a valve chamber intermediate said inlets, inlet ports of smaller diameter than said chamber connecting between said inlets and said chamber, a generally radially extending annular shoulder formed at the junction of said ports and the chamber, an outlet in said body, outlet port means leading generally radially from said chamber and communicating with said outlet, a pair of O-rings of relatively soft sealing material disposed in said chamber, the periphery of said rings being of no greater diameter than that of said chamber and in light engagement with the wall of said chamber, and a ball check of substantially the same diameter as that of said chamber loosely disposed in said chamber between said O-rings, the axial separation between said shoulders relative to the diameter of said chamber being such that with the ball in pressure engagement with one O-ring, if the free O-ring falls from its position against its shoulder it rests against the ball above center thereof, whereupon the ball may cam the free O-ring against its shoulder in response to a reversal of the pressure differential between the inlets, said O-rings being internally unconfined.

3. A transfer valve for fluid pressure systems comprising a body having opposed inlets for connection to separate sources of fluid under pressure, a valve chamber intermediate said inlets, inlet ports of smaller diameter than said chamber connecting between said inlets and said chamber, a generally radially extending annular shoulder formed at the junction of said ports and the chamber, an outlet in said body, outlet port means leading generally radially from said chamber and communicating with said outlet, a pair of rubber-like sealing rings mounted loosely in said chamber of substantially the same diameter as that of said chamber and in light resilient engagement with the wall of said chamber, and a ball check of substantially the same diameter as that of said chamber loosely disposed in said chamber between said sealing rings, the axial separation between said shoulders relative to the diameter of said chamber being such that with the ball in pressure engagement with one sealing ring, if the free sealing ring falls from its position fully against its shoulder to a position wherein one part of the ring engages the shoulder and a diametrically opposed part engages the ball, the point of engagement of the ring and the ball will be above a line passing through the center of the ball and the center of the ring section at the shoulder, whereupon the ball may cam the free sealing ring against its shoulder in response to a reversal of the pressure differential between the inlets, said O-rings being internally unconfined.

4. A transfer valve for fluid pressure systems comprising a body having inlets for connection to separate sources of fluid under pressure, a valve chamber in said body, inlet ports of a smaller diameter than said chamber opening into the ends thereof connecting between said inlets and said chamber, a generally radially extending annular shoulder formed at the junction of said ports and the chamber, an outlet in said body, outlet port means extending from said chamber and in communication with said outlet, a pair of O-rings of relatively soft sealing material disposed in said chamber, the periphery of said rings being of substantially the same diameter as that of said chamber and in light engagement with the walls of said chamber, a ball check of substantially the same diameter as that of said chamber loosely disposed in said chamber between said O-rings, the axial separation between said shoulders relative to the diameter being such that with the ball in pressure engagement with one O-ring, if the free O-ring falls from its position fully against its shoulder to a position wherein one portion of the ring engages the shoulder and the diametrically opposed portion engages the ball, the point of engagement of the ring and the ball will be above a line passing through the center of the ball and the center of the ring portion at the shoulders, whereupon the ball may cam the free O-ring fully against its shoulder in response to a reversal of the pressure differential between the inlets, said O-ring being entirely unconfined.

ANDREW G. JOHNSON.
THEODORE A. ST. CLAIR.

REFERENCES CITED

The following references are of record in the file of this patent:

UNITED STATES PATENTS

| Number | Name | Date |
|---|---|---|
| 1,675,231 | Stoke | June 26, 1928 |
| 2,381,484 | Blank | Aug. 7, 1945 |
| 2,484,102 | Valley | Oct. 11, 1949 |